United States Patent [19]
Saito

[11] Patent Number: 5,351,717
[45] Date of Patent: Oct. 4, 1994

[54] HIGH DIFFERENTIAL PRESSURE CONTROL VALVE

[75] Inventor: Takeshi Saito, Shizuoka, Japan

[73] Assignee: Bailey Japan Co., Ltd., Tagata, Japan

[21] Appl. No.: 113,281

[22] Filed: Aug. 27, 1993

[30] Foreign Application Priority Data

Oct. 9, 1992 [JP] Japan .................... 4-298111

[51] Int. Cl.⁵ ................ F16K 47/04; F16K 11/02
[52] U.S. Cl. ................ 137/625.12; 137/625.3; 137/625.39; 137/625.49; 251/127
[58] Field of Search .......... 137/625.3, 625.12, 625.39, 137/614.18, 625.49; 251/127

[56] References Cited

U.S. PATENT DOCUMENTS

| 1,307,986 | 6/1919 | Randall et al. ............. 137/625.39 |
| 3,821,968 | 7/1974 | Barb ........................ 137/625.3 |
| 3,880,399 | 4/1975 | Luthe ....................... 251/127 X |
| 4,258,750 | 3/1981 | Schnall et al. ............. 137/625.3 |

FOREIGN PATENT DOCUMENTS

| 6039911 | 9/1978 | Japan . |
| 211786 | 2/1986 | Japan . |
| 234533 | 10/1986 | Japan . |

Primary Examiner—Arnold Rosenthal
Attorney, Agent, or Firm—Dvorak and Traub

[57] ABSTRACT

A high differential pressure control valve having a plurality of stages of high resistance ports forming a high resistance passage and one or more low resistance ports forming a low resistance passage in a cage. The number of stages of low resistance ports is smaller than that of the high resistance ports so that a fluid at the side of an inlet passage is introduced into the high resistance passage under a low open degree range and into both the low resistance passage and the high resistance passage under a medium and a high open degree ranges.

3 Claims, 5 Drawing Sheets

F I G. 1A
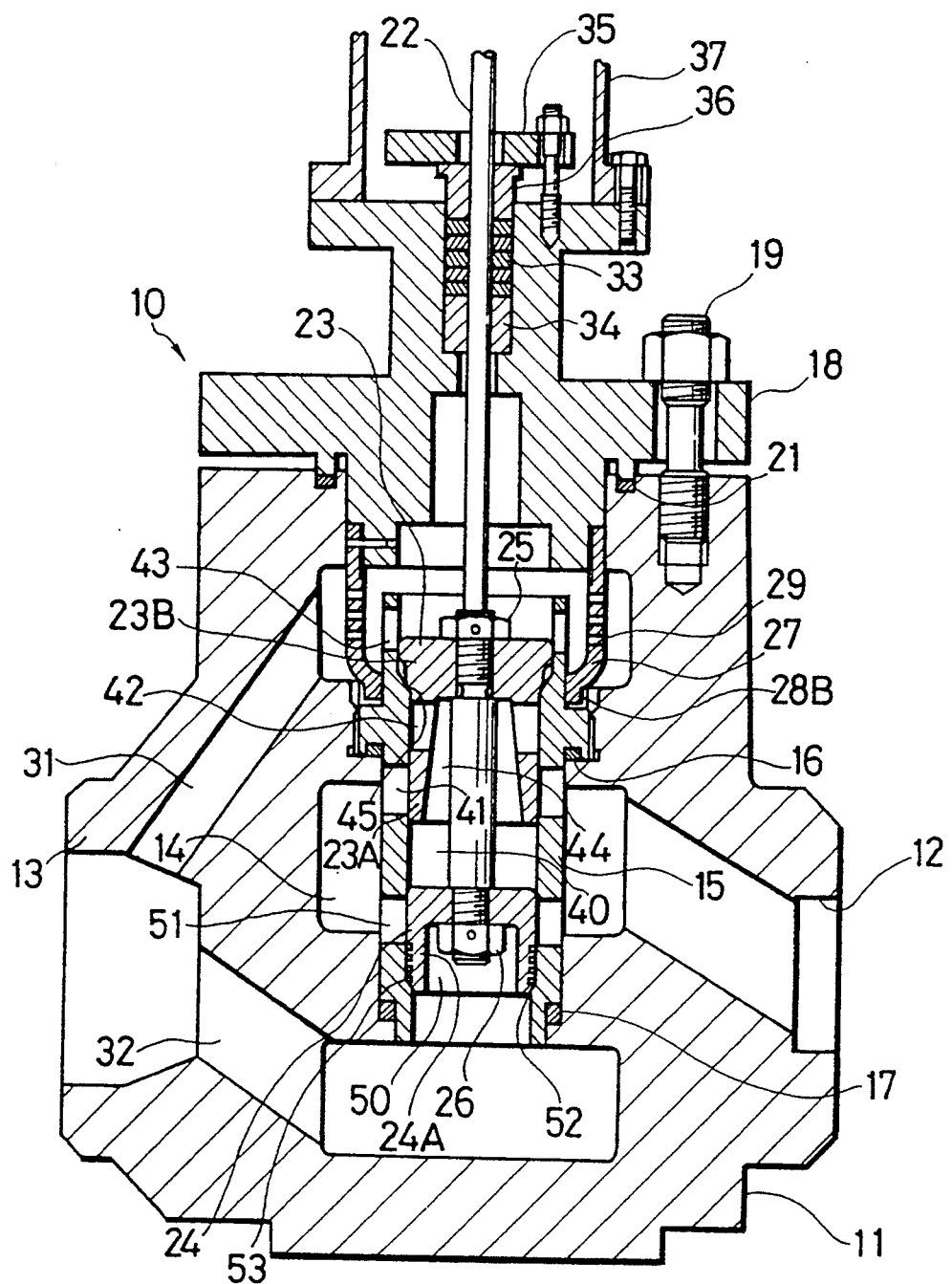

FIG. IB     FIG. IC     FIG. ID
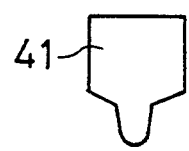 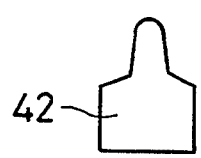 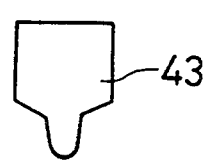
FIG. IE     FIG. IF
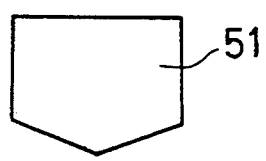 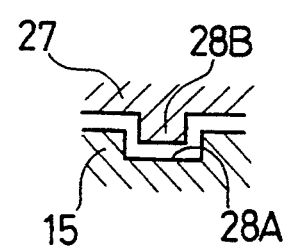

HIGH DIFFERENTIAL PRESSURE CONTROL VALVE

BACKGROUND OF THE INVENTION

1. Field of the Invention

The present invention relates to a high differential pressure control valve and more specifically to a boiler feed water control valve for a variable pressure power operation boiler which operates under a wide range of load conditions.

2. Description of the Background Art

In general, a high differential pressure control valve for variable pressure operation employed in a boiler feed water control valve for a variable pressure boiler is arranged between a high pressure boiler feed pump discharge side and a boiler inlet for controlling a boiler feed water flow rate corresponding to a load on the boiler. Upon start-up of the boiler or during low load operation, the high differential pressure control valve is used in a severe high differential pressure and low flow rate condition for substantially low pressure at the boiler side. Conversely, during high load operation, it is necessary to assure a high flow rate under a low differential pressure condition since the pressure at the boiler side has risen close to the discharge pressure of the pump. When a fluid passes through a minimum throttle portion under low load operation, a static pressure decrease below a saturation pressure of the fluid due to an increasing flow velocity may cause cavitation which can result in substantial damage to the components of the valve.

In order to avoid damage due to cavitation, it has been proposed ① to provide a porous-cage-type anti-cavitation valve having a special pore configuration as discussed in Japanese Examined Patent Publication No. 60-39911. ② It has also been proposed to provide a variable orifice incorporating a throttle valve as discussed in Japanese Examined Patent Publication No. 2-11786. ③ Another proposed has been to provide a high differential pressure control valve as discussed in Japanese Examined Utility Model Publication No. 2-34533.

The flow control employing the anti-cavitation valve in ① above is performed by moving a valve stem for intermittently opening and closing a plurality of special cage pores to provide a fixed flow resistance. Damage to the cage is also avoided by shifting the position of cavitation occurence away from the outlet of the pores of the cage. On the other hand, the variable orifice incorporating throttle valve in ② and the high differential pressure control valve in ③ are high resistance valves having a multi-stage pressure reducing mechanism continuously associated with movement of the valve stem.

In the valve constructions in ①, ② and ③ above, an unbalanced excessive thrust can be generated on the valve stem during a high differential pressure between inlet and outlet flow passage to require a substantial driving force for actuators connected to the valve stem. As a solution for this problem, the actual products employing the valve constructions in ①, ② and ③ above, employ balancing by-pass holes formed in a valve plug for reducing the unbalanced thrust. By-pass holes however require balancing seals around the valve plug to avoid leakage of the fluid from the high pressure side to the low pressure side.

The valves discussed above have the following problems (1)~(3).

(1) In the anti-cavitation valve of ①, since the flow rate control is performed by opening and closing the cage pores as fixed flow resistance, the flow characteristics becomes step-formed relative to the shifting magnitude of the valve stem to make it difficult to attain a high precision and continuous flow control. Also, since the cavitation is generated at the downstream side of the cage pore outlets, it can easily cause erosion on a seating surface of the valve plug.

(2) In the high resistance valves of ② and ③ o above, since there is only high resistance flow passage from the valve inlet to the valve outlet, it is difficult to provide sufficient flow rate at a low differential pressure condition during high load operation of the boiler. Therefore, it is necessary to provide an additional large size low resistance control valve in parallel with the high resistance valve. This is disadvantageous from an economical viewpoint.

(3) In the valve constructions of ①, ② and ③ above, there are further disadvantages associated with the necessity of providing balancing holes and balancing seals for reducing the thrust to act on the valve plug.
(a) The balancing seal is subject to wear and damage due to foreign matter contained in the fluid resulting in leakage. The leakage of the fluid through the balancing seal may cause erosion to the valve components located in the vicinity of the balancing seal. (b) A sliding surface on which the balancing seal is mounted must be hardened and requires a mirror finish, which also increases manufacturing cost. (c) Substantially delicate work is required for disassembling and assembling the balancing seal thereby increasing maintenance costs.

SUMMARY OF THE INVENTION

Therefore, it is an object of the present invention to provide a high differential pressure control valve which will not cause a step-formed flow characteristic and cavitation erosion at a valve plug seating surface.

It is a further object of the present invention to provide a high differential pressure control valve that does not require a parallel low resistance control valve and that will not have increased manufacturing cost associated with the presence of a balancing seal.

It is a further object of the present invention to provide a high differential control valve that provides a stable high precision and continuous flow control for a long period.

In order to accomplish the above-mentioned objects, a high differential pressure control valve, according to a first aspect of the invention, includes a casing having an inlet passage and an outlet passage, a cage provided between the inlet passage and the outlet passage in the casing and a plurality of stages of ports, a valve stem inserted into the cage and movable relative to the casing and the cage, the valve stem carrying a plurality of disc portions provided corresponding to respective ports in the cage for opening and closing the latter, flow control areas of the respective ports being increased and decreased according to an opening and closing operation by respective disc portions for the valve stem to sequentially reduce the pressure of the fluid at the inlet passage side to discharge, wherein the high differential pressure control valve has a plurality of stages of high resistance ports forming a high resistance passage and low resistance ports forming a low resistance passage, the number of stages of which is smaller than that of the high resistance ports, being provided in the cage, a high resistance passage shut-off seat provided in the cage at a position downstream of an inlet side port of the high resistance passage being opened and closed by corresponding one of the disc portions and low resistance passage shut-off seat provided in the cage at a position downstream of an inlet side port of the low resistance passage being opened and closed by corresponding one of the disc portions, respective of the disc portion being arranged with respect to the ports of the cage so that a fluid at the side of the inlet passage being introduced into the high resistance passage under low open degree range of a valve stroke and into the low resistance passage in addition to the high resistance passage under a medium and a high open degree range of the valve stroke, and respective of the disc portions being arranged so that the pressure of the fluid introduced into the cage from the inlet passage will act on mutually mating upper and lower end faces of the disc portions opposing on the axis of the valve stem.

In the preferred construction, a high resistance port is also formed on the disc portion which opens and closes the high resistance ports of the cages forming the high resistance passage.

According to a second aspect of the invention, a high differential pressure control valve includes a casing having an inlet passage and an outlet passage, a cage provided between the inlet passage and the outlet passage in the casing and having a plurality of stages of ports, a valve stem inserted into the cage and movable relative to the casing and the cage, the valve stem carrying a plurality of disc portions provided corresponding to respective ports in the cage for opening and closing the latter, flow control areas of the respective ports being increased and decreased according to an opening and closing operation by respective disc portions for the valve stem to sequentially reduce the pressure of the fluid at the inlet passage side to discharge, wherein the high differential pressure control valve comprises, a plurality of stages of high resistance ports forming a high resistance passage being provided in the cage, a high resistance port also being provided in the disc portion for opening and closing the high resistance port of the cage, and a high resistance passage shut-off seat provided in the cage at a position downstream of an inlet side port of the high resistance passage being opened and closed by corresponding one of the disc portions.

According to the first aspect of the invention, the following effects of ①~⑤.

① While the valve is fully closed by the disc portion on the valve stem and respective ports of the cage.

② While the valves are opened, the ports of the cage are continuously and gradually opened or closed by the disc portions. Accordingly, the fluid flow rate is smoothly increased or decreased in perfectly continuous fashion relative to the magnitude of movement of the valve stem. This permits the high precision and continuous flow control of the fluid flow.

③ During start-up of the boiler or under low load operation, once the valve starts to open in the low open degree range, ports at the side of the high resistance passage are gradually opened. Then, the high differential pressure fluid is lowered in pressure in stepwise fashion by respective ports. The flow direction is also sharply varied between respective ports, so that the high differential pressure fluid is subject to substantial variable pressure loss and is subsequently regulated with a final stage pressure loss by the baffle pores of the outer cage to be discharged through the outlet flow passage. Since the fluid pressure is reduced in stepwise fashion in the high pressure resistance passage, cavitation will not occur so that the high resistance shut-off seat will not be damaged due to erosion. Furthermore, the port at the side of the low resistance passage is closed by the disc portion so that the high differential pressure fluid will not flow into the low resistance passage, and therefore cavitation will not occur and damage to the low resistance shut-off seat will not occur.

④ When the boiler operation mode is shifted into the higher load operation to increase boiler pressure which lowers the valve differential pressure, the port at the side of the low resistance passage starts to open. Then, the low differential pressure fluid partially flows through the low resistance passage as well as the high resistance passage to confluence in the outlet flow passage. At this time, the flow rate to be discharged through the outlet flow passage becomes a total flow rate of the flow rates in the high resistance passage and the low resistance passage. The flow rate is inversely proportional to the route of the resistance coefficient ($\xi = 2gh/Q^2$), and the majority of fluid flows through the low resistance passage so that large amount of low differential pressure fluid which will not generate cavitation will directly flow into the outlet flow passage through the small number of stages of ports at the side of the low resistance passage. Therefore, at high load operation, a sufficient amount of the fluid can be supplied without requiring a separate low resistance control valve.

⑤ During start-up and high load operation, the high pressure fluid flowing into the high resistance passage via the inlet port of the high resistance flow passage simultaneously acts on the end faces of both the upper and lower discs opposing the axis of the valve stem to mutually cancel the thrusting force so that excessive thrusting force will not be exerted on the valve stem. Therefore, even under a severe high differential pressure condition, the valve stem can be driven smoothly by an ordinary actuator to permit positioning thereof with high precision without requiring balancing holes and balancing seals.

Accordingly, with the effects of ①~⑤ it becomes possible to provide a high differential pressure control valve in which the variation of the flow rate can be held perfectly continuous, damage to the shut-off seat by erosion will not occur, a separate low resistance control valve is not required, increasing of the cost and/or degradation of maintenance associated with balancing seals will not occur, and the stable high precision flow rate control can be provided for a long duration.

⑥ In a first preferred embodiment of the invention, reduction of the pressure of the high differential pressure fluid can be attained not only by respective ports in the cage but also by the port in the disc portion. This permits formation of the high resistance passage compact.

⑦ The second embodiment of the invention is constructed by omitting the side of the low resistance passage to have only construction of the high resistance side to achieve the above-mentioned effects of ①, ②, ③ and ⑥.

BRIEF DESCRIPTION OF THE DRAWINGS

The present invention will be understood more fully from the detailed description given herebelow and from the accompanying drawings of the preferred embodiment of the invention which are not to be taken as limitations of the invention, but as embodiments illustrative of the principles of the invention.

In the drawings:

FIG. 1A is a sectional view of a preferred embodiment of a high differential pressure control valve in a fully closed position.

FIG. 1B is a sectional view of a high resistance inlet port of the present invention.

FIG. 1C is a sectional view of a high resistance intermediate port of the present invention.

FIG. 1D is a sectional view of a high resistance outlet port of the present invention.

FIG. 1E is a sectional view of a low resistance flow port of the present invention.

FIG. 1F is a sectional view of an anti-rotation claw and engaging recess of the present invention.

DESCRIPTION OF THE PREFERRED EMBODIMENT

Figure 2:
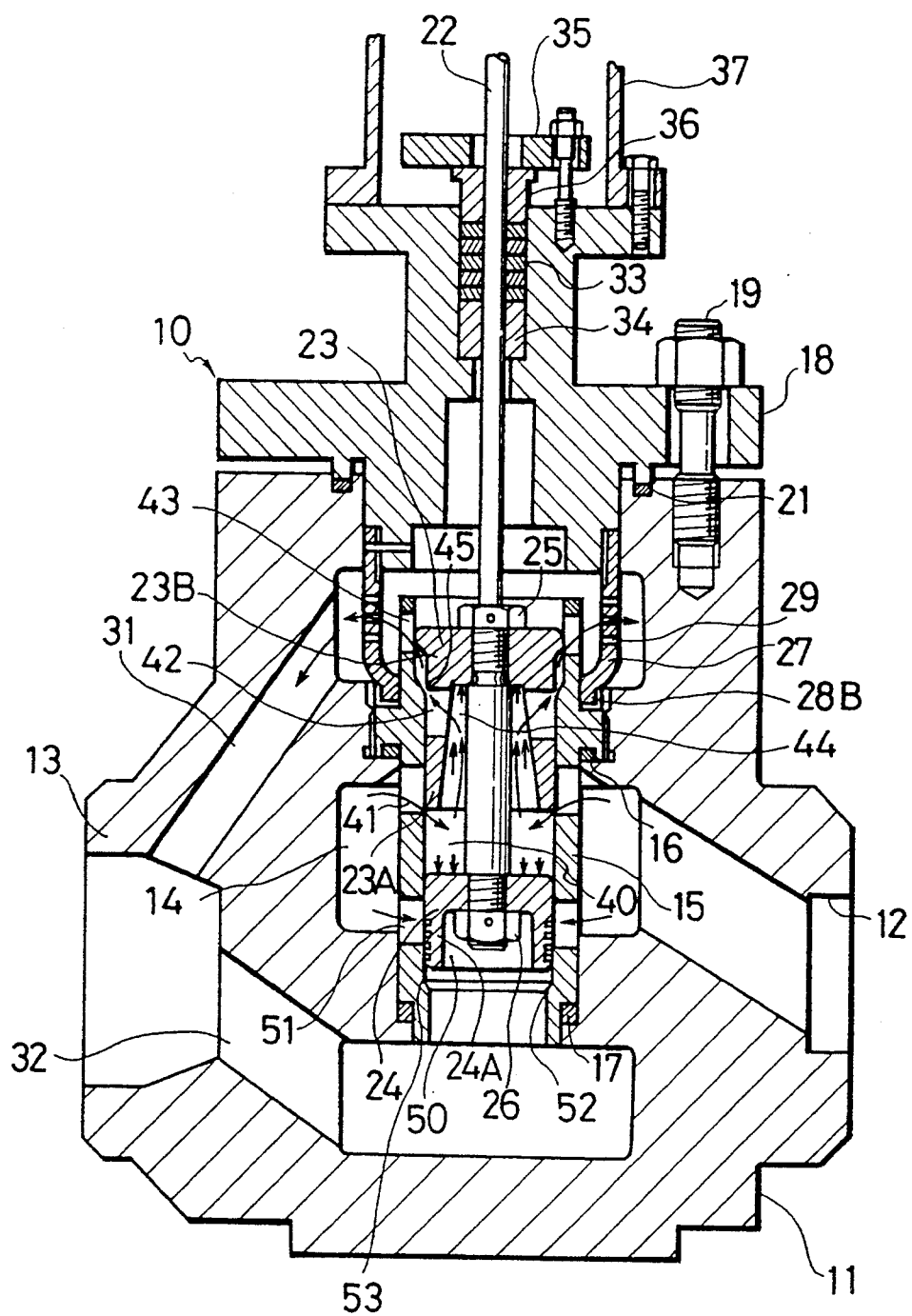
FIG. 2 is a sectional view of a preferred embodiment of the high differential pressure control valve in an open position under a low open degree range.

FIG. 1A illustrates a high differential pressure control valve 10 having an inlet flow passage 12 and an outlet flow passage 13 provided in a casing 11. A valve chamber 14 is defined at an intersection of the inlet flow passage 12 and the outlet flow passage 13. The high pressure control valve 10 includes a cage 15 extending through the center of the valve chamber 14. The cage 15 is threadingly engaged to the casing 11. The cage 15 has multi-stage ports including a high resistance inlet port 41, a high resistance outlet port 43, a low resistance port 51, which will be further discussed below. Also, the cage 15 includes an upper gasket 16 and a lower gasket 17 at the upper and lower positions of the valve chamber 14 between the casing 11. A valve lid 18 is fixed to the casing 11 by means of a stud bolt 19 threadingly engaged to the casing 11. A gasket 21 is also disposed between the casing 11 and the valve lid 18. A valve stem 22 is inserted through a valve lid 18 which is fixed to the casing 11. The valve stem 22 is movable relative to the casing 11 and the cage 15 and carries an upper disc 23 and a lower disc 24 which are secured thereon by means of fastening nuts 25 and 26, respectively. Each nut 25 and 26 is secured on the valve stem 22 by means of a pin. The upper disc 23 has disc portions 23A and 23B corresponding to the inlet port 41 and the high resistance outlet port 43 respectively for opening and closing the respective ports 41 and 43. The lower disc 24 includes a disc portion 24A corresponding to the low resistance port 51 for opening and closing the port 51.

High resistance intermediate ports 42 are formed at a plurality of circumferential positions between the disc portions 23A and 23B of the upper disc 23 and are adapted to be opened and closed by the cage 15. An outer cage 27 is arranged around the high resistance outlet port 43 of the cage 15. The upper end portion of the outer cage 27 is fixed to the valve lid 28 by means of a knock pin. The outer cage 27 also has an anti-rotation claw 28B at the lower end. The anti-rotation claw 28B engages with an engaging recess 28A formed in an intermediate outer collar portion of the cage 15 as shown in FIG. 1F. The outer cage 27 defines a plurality of baffle pores 29. The casing 11 defines a high resistance outlet portion 31 communicating with the outlet flow passage 13 at the outlet side of the pores 29. The casing 11 also defines a low resistance outlet portion 32 communicating with the outlet flow passage 13 at a position below the low resistance port 51 of the cage 15.

A packing and the valve stem 22. The packing 33 is clamped between a packing retainer 34 and a packing holder 36 supported at the back side by means of a packing flange 35. A threaded portion 22A is formed at the upper end portion of the valve stem 22 for threading connection with a valve opening and closing actuator 37.

The high differential pressure control valve controls the flow control areas of ports 41, 43 and 51 defined by respective disc portions 23A, 23B and 24A of the upper and lower discs 23 and 24 by an opening and closing operation of the valve stem 22 for continuous reduction of the pressure of the fluid in the inlet flow passage 12, and to flow the fluid into the outlet flow passage 13 from the high resistance flow passage 31 or the low resistance outlet portion 32. In the high differential pressure control valve 10, a high resistance passage 40 is defined between the valve chamber 14 communicating with the inlet flow passage 12 and the high resistance flow passage 31. The high differential pressure control valve 10 defines a high resistance inlet port 41 as shown in FIG. 1B and a high resistance outlet port 43 shown in FIG. 1D at a plurality of respective circumferential positions of the intermediate or upper position of the cage 15. The high resistance inlet port 41 opened and closed by the disc portion 23A of the upper disc 23 as set forth above and the high resistance outlet port 43 is adapted to be opened and closed by the disc portion 23B of the upper disc 23. The high resistance intermediate ports 42 shown in FIG. 1C are defined at a plurality of circumferential positions between the disc portion 23A and 23B of the upper disc 23. The high resistance intermediate ports 42 are adapted to be opened and closed by the cage 15. The high resistance inlet port 41 is located in opposition to the valve chamber 14 and the high resistance outlet port 43 is located in opposition to the outer cage 27. Location of the intermediate port 42 is designed so that the ports communicate with the outlet port 43 while they are held in the open position. The upper disc 23 is provided with a guide passage 44 for guiding the fluid flowing through the high resistance inlet port 41 to the intermediate port 42. In the high differential pressure control valve 10, a low resistance path 50 is defined between the valve chamber 14 communicating with the inlet flow passage 12 and the low resistance outlet portion 32. The high differential pressure control valve 10 also defines a low resistance flow port 51 shown in FIG. 1E at a plurality of circumferential positions of the lower end portion of the cage 15. The low resistance flow port 51 is opened and closed by the disc portion 24A of the lower disc 24 as set forth above. The low resistance flow port 51 communicates with the valve chamber 14 and is designed so that it communicates with the low resistance outlet portion 32 while the disc portion 24A is held in the open position.

Figure 3:
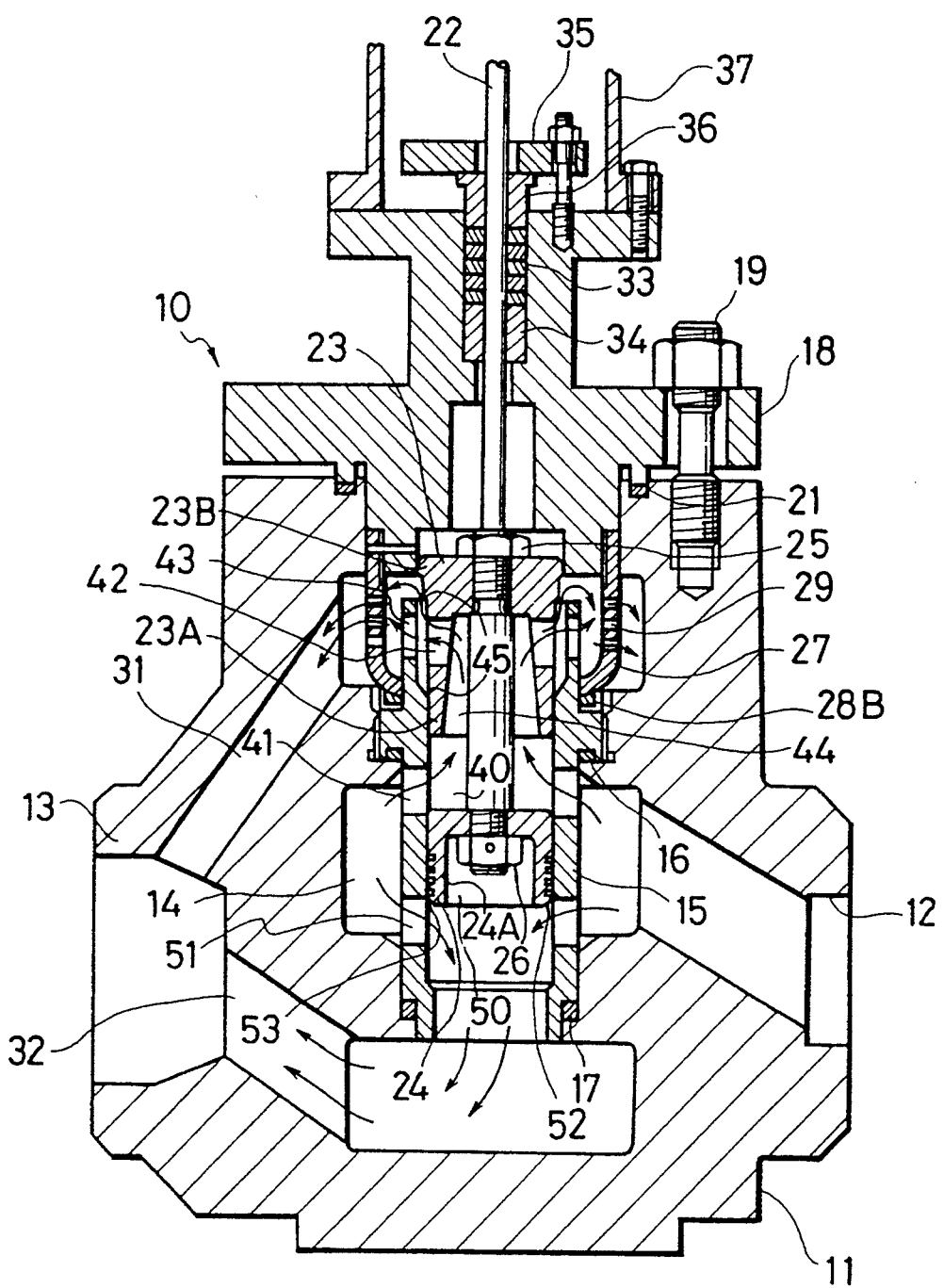
FIG. 3 is a sectional view of the preferred embodiment of the high differential pressure control valve in an open position under a medium or a high open degree range.
Figure 4:
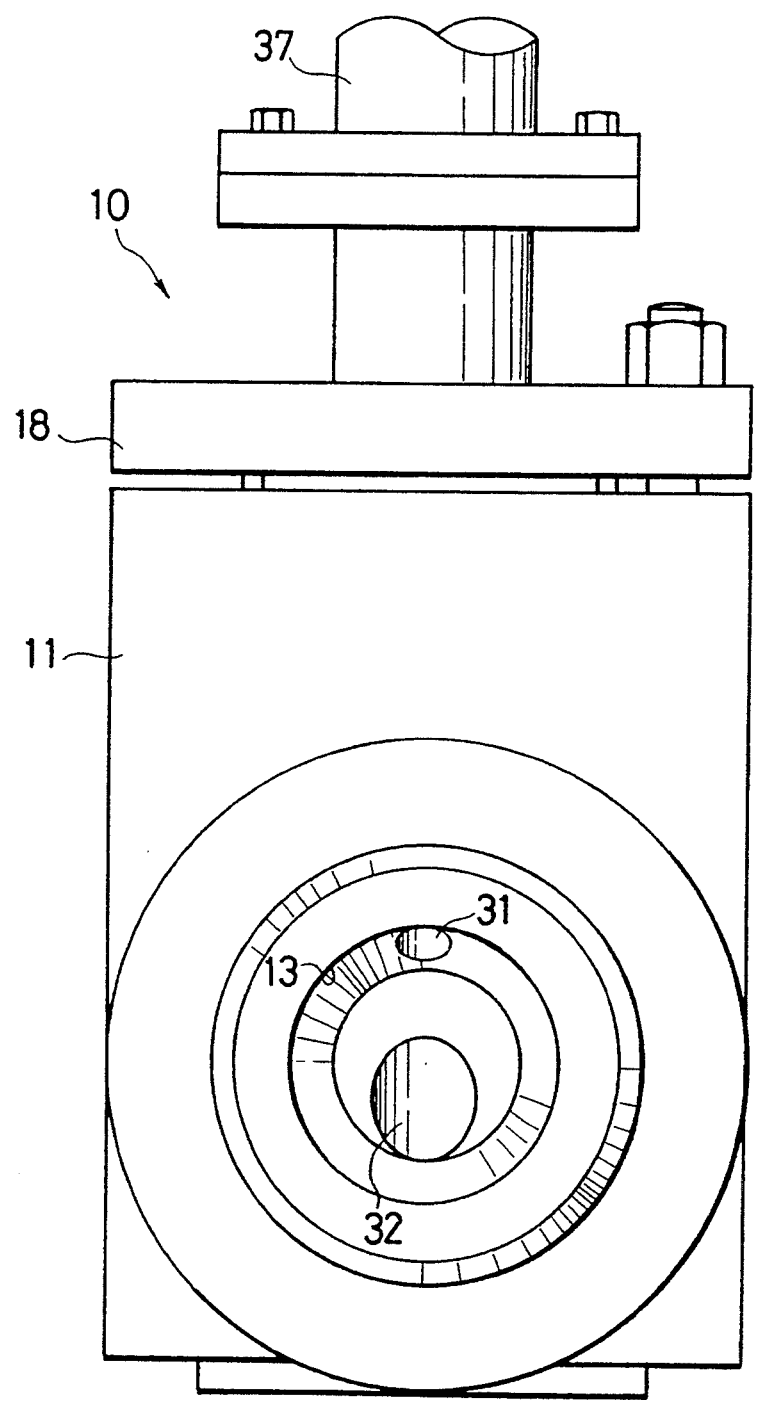
FIG. 4 is a side elevation view taken from a side of an outlet flow passage in FIG. 1.

In the high differential pressure control valve 10 at a position downstream of the intermediate port 42 of the high resistance passage 40, a high resistance passage shut-off seat 45 provided in the cage 15 can be opened and closed by the lower peripheral portion of the disc portion 23B of the corresponding upper disc 23. Furthermore, in the high differential pressure control valve 10 at a position down stream of the port 51 of the low resistance flow passage 50, a low resistance passage shut-off seat 52 provided in the cage 15 can be opened and closed by the lower peripheral portion of the disc portion 24A of the lower disc 24. A pressure reducing labyrinth groove 53 is provided on the outer periphery of the disc portion 24A of the lower disc 24 at the position in the vicinity of the lower end thereof. The labyrinth groove 53 is adapted to prevent leakage of the fluid from the port 51 to the low resistance outlet portion 32 while the port 51 is closed by the disc portion 24A. In the high differential pressure control valve 10, disc portions 23A, 23B and 24A are arranged relative to respective of the associated ports 41, 43 and 51, and the port 42 of the upper disc 23 is arranged relative to the cage 15 so that in the low open degree range shown in FIG. 2, the fluid at the side of the inlet flow passage 12 is guided to the high resistance flow passage 40 from the valve chamber 14. In the medium or high open degree range shown in FIG. 3, the fluid at the side of the inlet flow passage 12 is guided to the low resistance flow passage 50 as well as the high resistance flow passage 40 from the valve chamber 14. In the high differential pressure control valve 10, respective discs 23 and 24 are arranged so that the pressure of the high pressure fluid flowing into the cage 15 from the side of the inlet flow passage 12 via the valve chamber 14 acts on the lower end face of the upper disc 23 and the upper end face of the lower disc 24 axially mating on the axis of the valve stem 22, simultaneously.

The operation of the above-mentioned embodiment will be discussed herebelow.

① While the valve is fully closed, ports 41, 43 and 51 of the cage 15 are closed by the corresponding disc portions 23A, 23B and 24 on the valve stem 22. At this time, the fluid introduced through the inlet flow passage 12 contact with the outer circumferencial surface of respective disc portions 23A, 24A, and is shut-off by the disc portions 23A and 24A respectively corresponding to the inlet port 41 of the high resistance flow passage 40 and the inlet flow port 51 of the low resistance flow passage 40.

② While the valves are opened by shifting of the valve stem 22 upwardly, the respective ports 41, 43 and 51 of the cage 15 is continuously and gradually opened and closed by the disc portions 23A, 23B and 24A. Accordingly, the fluid flow rate is continuously increased and decreased relative to the magnitude of movement of the valve stem This permits high precision continuous control of the fluid flow.

③ During start-up of the boiler or under low load operation, once the valve starts to open, in the low open degree range, ports 41, 42 and 43 at the side of the high resistance passage 40 are gradually opened by an upward movement of the valve stem 22. Then, the high differential pressure fluid is lowered in the pressure in stepwise fashion by the respective ports 41, 42, and 43 of the cage 15 and the upper disc 23. The flow direction is also sharply varied between respective ports 41, 42 and 43 so that the high differential pressure fluid is subject to substantial variable pressure loss and is subsequently regulated with a final stage pressure loss by the baffle pores 29 of the outer cage to be discharged through the outlet flow passage 13. Since the fluid pressure is reduced in stepwise fashion in the high resistance passage 40, cavitation will not occur so that the high resistance shut-off seat and the components therearound will not cause damage due to erosion. Furthermore, the port 51 at the side of the low resistance passage 50 is closed by the disc portion 24A so that the high differential pressure fluid will not flow into the low resistance passage 50 and therefore cavitation will not occur and damage to the low resistance shut-off seat and the components therearound due to erosion will not occur.

④ When the boiler operation mode is moved into the high load operation to lower the valve differential pressure, the port 51 at the side of the low resistance passage 50 starts to open. Then, the low differential pressure fluid partially flows through the low resistance passage 50 as well as the high resistance passage 40 to confluence in the outlet flow passage 13. At this time, the flow rate to be discharged through the outlet flow passage 13 becomes a total flow rate of the flow rates in the high resistance passage 40 and the low resistance passage 50. The flow rate is inversely proportional to the route of the resistance coefficient ($\xi = 2gh/Q^2$) and the majority of fluid flows through the low resistance passage 50 so that large amount of low differential pressure fluid which will not generate cavitation will flow into the outlet flow passage 13 through the single stage port 51 at the side of the low resistance passage 50. Therefore, at high load operation, a sufficient amount of the fluid can be supplied without requiring a separate low resistance control valve.

⑤ During start-up and high load operation, the high pressure fluid flowing into the high resistance passage 40 via the high resistance inlet port 41 at the side of the high resistance passage 40 simultaneously acts on the end faces of both the upper and lower discs 23, 24 opposing the axis of the valve stem 22 to mutually cancel the thrusting force so that excessive thrusting force will not be exerted on the valve stem 22. Therefore, even under a severe high differential pressure condition, the valve stem 22 can be driven smoothly by an ordinary actuator 37 to permit positioning thereof with high precision without requiring balancing holes and balancing seals.

⑥ In the low open degree range, the high differential pressure fluid is reduced in pressure by the ports 41 and 43 of the cage 15 and also by port 42 of the upper disc 23. Therefore, it becomes possible to form the high resistance passage in compact.

In implementation of the present invention, the number of stages of the low resistance port forming the low resistance passage is not specified to the single stage as in the embodiment shown and can be any smaller number of stages than that of the high resistance ports. Also, the high resistance shut-off seat provided in the cage can be provided at any position of the high resistance passage as long as it is positioned downstream of the inlet port. Similarly, the low resistance shut-off seat provided in the cage can be located at any position in the low resistance passage as long as it is located downstream of the inlet port. Furthermore, as an alternative embodiment of the high differential pressure control valve of the present invention, it is possible to omit the construction associated with the low resistance flow passage 50 in the high differential pressure control valve 10 and to form the valve only with the high resistance passage 40. In this case, if necessary, a low resistance control valve may be provided in parallel for assuring a necessary flow rate under low differential pressure conditions to operate in the dual valve system of the high differential pressure control valve of the invention and the low resistance control valve. Even in this case, the foregoing effects in ①, ②, ③ and ⑥ in the high differential pressure control valve 10 can be attained. It should be noted when the high differential pressure control valve is constructed only with the high resistance passage 40 side, the high resistance passage 40 may be divided vertically into upper and lower high resistance passages 40A and 40B which may be branched from upper and lower inlet ports defined in the cage.

Although the invention has been illustrated and described with respect to one or more exemplary embodiments thereof, it should be understood by those skilled in the art that the foregoing and various other changes, omissions and additions may be made therein and thereto, without departing from the spirit and scope of the present invention. Therefore, the present invention should not be understood as being limited to the specific embodiments set out above but to include all possible embodiments which can be embodied within a scope encompassed and equivalents thereof with respect to the features set out in the appended claims.

What is claimed is:

1. A high differential pressure control valve including a casing having an inlet passage and an outlet passage, a cage provided between the inlet passage and the outlet passage in the casing and having a plurality of stages of ports, a valve stem inserted into the cage and movable relative to the casing and the cage, the valve stem carrying a plurality of disc portions corresponding to respective ports in the cage for opening and closing the latter, wherein the fluid flow control areas of the respective ports are increased and decreased according to opening and closing of the disc portions relative to the respective ports to sequentially reduce fluid pressure at the inlet passage side to discharge, wherein the high differential pressure control valve comprises:

a plurality of stages of high resistance ports forming a high resistance passage and one or more low resistance ports forming a low resistance passage being provided in the cage;

a high resistance passage shut-off seat provided in the cage at a position downstream of an inlet side port of the high resistance passage being opened and closed by corresponding one of the disc portions;

a low resistance passage shut-off seat provided in the cage at a position downstream of an inlet side port of the low resistance passage being opened and closed by corresponding one of the disc portions;

respective of the disc portions movable in relation to the ports of the cage so that a fluid at the side of the inlet passage is introduced into the high resistance passage under a low open degree range and into the low resistance passage and the high resistance passage under a medium and a high open degree range; and respective of the disc portions having an upper end face and a lower end face wherein pressure of the fluid introduced into the cage from the inlet passage acts on the upper end face of on disk portion and an opposing lower end face of another disc portion.

2. A high differential pressure control valve as set forth in claim 1, wherein a high resistance port forming the high resistance passage is also formed on the disc portion which opens and closes the high resistance ports in the cage.

3. A high differential pressure control valve including a casing having an inlet passage and an outlet passage, a cage providing between the inlet passage and the outlet passage in the casing and having a plurality of stages of ports, a valve stem inserted into the cage and movable relative to the casing and the cage, the valve stem carrying a plurality of disc portions corresponding to respective ports in the cage for opening and closing the latter, wherein fluid flow control areas of the respective portions are increased and decreased according to opening and closing of the ports by the disc portions to sequentially reduce fluid pressure at the inlet passage side to discharge, wherein the high differential pressure control valve comprises:

a plurality of stages of high resistance ports forming a high resistance passage being provided in the cage;

a high resistance port disposed in the disc portion which opens and closes the high resistance ports of the cage; and a high resistance passage shut-off seat provided in the cage at a position downstream of an inlet side port of the high resistance passage, being opened and closed by corresponding one of the disc portions.

* * * * *